Dec. 22, 1925. 1,566,803
R. H. MORRIS
ADJUSTABLE SUPPORT FOR TRUCKS AND TRAILERS
Filed April 2, 1924
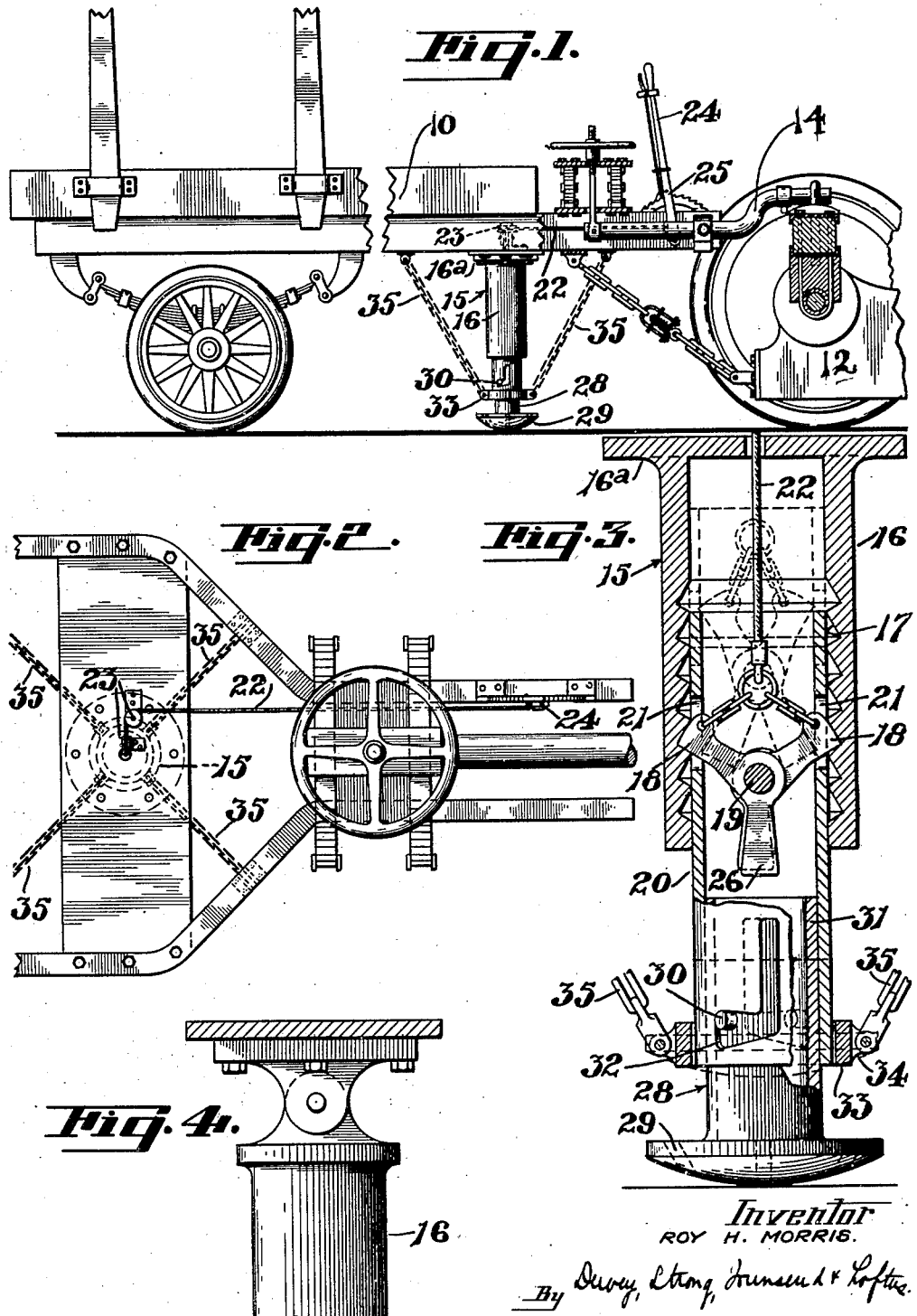
Inventor
ROY H. MORRIS.

Patented Dec. 22, 1925.

1,566,803

UNITED STATES PATENT OFFICE.

ROY H. MORRIS, OF PIEDMONT, CALIFORNIA.

ADJUSTABLE SUPPORT FOR TRUCKS AND TRAILERS.

Application filed April 2, 1924. Serial No. 703,696.

*To all whom it may concern:*

Be it known that I, ROY H. MORRIS, a citizen of the United States, residing at Piedmont, county of Alameda, and State of California, have invented new and useful Improvements in Adjustable Supports for Trucks and Trailers, of which the following is a specification.

This invention relates to two-wheeled trailers and particularly pertains to an adjustable support therefor.

Prior to my invention, two-wheeled trailers were fitted at their front ends with hinged supports which were adapted to maintain the trailers level during the period they were disconnected from their traction means. These hinged supports have not proven entirely satisfactory because inequalities in the road or softness of the supporting ground often prevented the support from being swung to an inoperative position after a tractor had been connected to the trailer. Therefore, it is the principal object of the present invention to provide an improved adjustable support for trailers which may be easily and quickly raised to an inoperative position regardless of road inequalities or softness.

The best known form which the invention may assume is exemplified in the following description and illustrated in the accompanying drawings, in which:

Fig. 1 is a fragmentary view in side elevation of a trailer connected to a tractor and disclosing my improved support.

Fig. 2 is an enlarged fragmentary plan view of the front end of the trailer.

Fig. 3 is an enlarged longitudinal sectional view through the support with parts in full to disclose certain details of construction.

Fig. 4 is a fragmentary view disclosing a modified form of connection between the support and the trailer.

Referring more particularly to the accompanying drawings, 10 indicates a trailer connected to a tractor 12 by a connection 14.

When the tractor has been disconnected from the trailer, it is desirable to maintain the latter level for loading purposes. To accomplish this, I provide a pedestal support 15. This support comprises a cylinder 16 which is formed at its upper end with a flange 16ª and which is bolted to the bottom of the trailer frame. In Fig. 4, a pivotal connection is shown for connecting the cylinder to the trailer.

A plurality of annular grooves 17 are formed in the interior surface of this cylinder for co-operation with a pair of locking dogs 18. These members are pivotally mounted on a pin 19 which is carried by a sleeve 20. This latter member is reciprocably mounted in the cylinder 16 and is formed with apertures 21 through which the locking dogs 18 may project to engage the grooves 17 and thereby hold the sleeve in position.

The upper ends of the locking dogs are connected to a cable 22 which passes over pulleys 23 and connects with an operating lever 24. This lever is pivotally mounted on the trailer frame and is fitted with a pawl and ratchet device 25 by which it may be latched in position. Movement of the lever in one direction will tend to release the locking dogs and then elevate the sleeve 20 as shown in dotted lines in Fig. 3. When the lever is moved in the opposite direction the sleeve will be lowered by gravity until the foot member engages the ground after which the locking dogs will be actuated by gravity to extend through the apertures in the sleeve and the locking dogs engage the grooves in the cylinder to lock the sleeve 20 in position. The locking dogs are each provided with an extension 26. These extensions act to project the dogs through the apertures and engage them with the grooves in the cylinders immediately the cable becomes slack.

A foot member 28 is provided and is slidably mounted in the lower end of the sleeve 20. This member is formed with an enlarged lower end 29 which is engaged with the ground when the support is in use.

A pin 30 is fixed on the cylindrical portion 31 of the foot member for co-operation with a bayonet slot 32 formed in the sleeve 20.

When the device is in use supporting the front end of the trailer, the pin 30 is disposed in the transverse portion of the slot as shown in Fig. 3.

To brace the support, a ring 33 is mounted at the lower end of the sleeve 20. This ring is formed with lugs 34 which are connected to the trailer frame by chains 35.

In operation of the device, to lower the support the lever 24 is released to lower the sleeve 20 until the foot member engages the ground. The slack in the cable then permits the locking dogs to engage the grooves in the cylinder and thereby latch the sleeve in position. The trailer may then be disconnected from the tractor and loaded.

When the trailer has been loaded and connected to the tractor, a crowbar may be inserted through one of the holes 29 in the lower end of the foot member to turn the latter and thereby disengage the pin 30 from the transverse portion of the bayonet slot 31. This will relieve the weight from the support and permit the lever 24 to be operated to disengage the locking dogs and elevate the sleeve and foot member to an inoperative position.

While I have shown the preferred form of my invention, it is understood that various changes may be made in its construction without departing from the spirit of the invention as defined in the appended claims.

Having thus described my invention, what I claim and desire to secure by Letters Patent is:—

1. An adjustable support for a semi-trailer comprising a cylinder disposed beneath and connected to said trailer, a sleeve having its upper ends telescoped within said cylinder and having a foot member at its lower ends engageable with the ground, latching means carried by the sleeve and adapted to detachably connect the sleeve to said cylinder, whereby the support will sustain the weight of the trailer, and operating means connected to said latching means and adapted upon operation to simultaneously release the locking means to disconnect the sleeve from the cylinder and elevate the sleeve.

2. An adjustable support for a vehicle comprising a cylinder disposed beneath and connected to the vehicle, a sleeve telescoping within said cylinder, said sleeve carrying a foot member, means for locking said sleeve with relation to said cylinder, said means comprising grooves formed in the cylinder, locking members engageable therewith carried by the sleeve, and operating means connected to said locking members and adapted upon operation to simultaneously disengage said members from said grooves and elevate said sleeve, and means whereby said locking members will automatically engage said grooves when said sleeve has been lowered until the foot member engages the supporting ground.

3. An adjustable support for a vehicle comprising a pair of vertically arranged telescoping members disposed beneath and connected to the vehicle, operable locking means for maintaining said members in a set position, a foot member telescoping in the lowermost of said members and engageable with the ground when said members are extended, a pin carried by said foot member and engageable with a bayonet slot in the member carrying the foot member whereby the latter may be turned and relieved from engagement with the ground to permit said locking means to be released and said members telescoped to raise the foot member to an inoperative position.

4. An adjustable support for a vehicle comprising a vertically arranged cylinder disposed beneath and connected to said vehicle, a sleeve telescoping within said cylinder, a foot member carried by the said sleeve and telescoping in the lower end thereof. lock members carried by said sleeve and engageable with grooves formed in said cylinder to maintain said sleeve extended and thereby support said vehicle, a pin carried by said foot member, a bayonet slot in said sleeve cooperating with said pin whereby said foot member may be held extended from said sleeve or turned and telescoped within said sleeve, operable means for releasing said lock members and raising said sleeve and for maintaining said sleeve in its raised position.

5. An adjustable support for a vehicle comprising a vertically arranged cylinder disposed beneath and carried by the vehicle, a sleeve reciprocable in said cylinder, apertures in said sleeve, pivotal locking members disposed within the sleeve and carried thereby, said locking members being adapted to project through said apertures to cooperate with grooves formed in the cylinder and thereby maintain said sleeve in an extended position, a cable connected to said locking members, a lever connected to said cable for operating the same, a pull on said cable causing said locking members to release and said sleeve to rise, a foot member carried at the lower end of the sleeve and telescoping therein, a pin on said foot member engaging a bayonet slot in said sleeve whereby the foot member may be held extended from said sleeve or be turned and telescoped within said sleeve to permit the locking members to be released, a ring at the lower end of the sleeve, chains connecting said ring to the vehicle, a latching mechanism associated with said lever whereby said sleeve may be held in its raised position.

ROY H. MORRIS.